(12) United States Patent
Popik et al.

(10) Patent No.: US 7,487,633 B2
(45) Date of Patent: Feb. 10, 2009

(54) DEVICE FOR EXHAUST GAS PURIFICATION FOR SPARK-IGNITED ENGINES

(75) Inventors: Janusz Popik, Mississauga (CA); Ryszard Zbigniew Popik, Brampton (CA); Justin Xiaogang Yao, Markham (CA)

(73) Assignee: Nett Technologies Inc., Mississauga, Ontario (CA)

( * ) Notice: Subject to any disclaimer, the term of this patent is extended or adjusted under 35 U.S.C. 154(b) by 5 days.

(21) Appl. No.: 11/564,891

(22) Filed: Nov. 30, 2006

(65) Prior Publication Data
US 2007/0119433 A1 May 31, 2007

Related U.S. Application Data

(60) Provisional application No. 60/740,667, filed on Nov. 30, 2005.

(51) Int. Cl.
*F01N 3/00* (2006.01)
(52) U.S. Cl. .............................. 60/289; 60/299; 60/302; 60/317; 60/318; 60/319; 60/324; 181/231; 181/240; 181/249
(58) Field of Classification Search .................. 60/282, 60/289, 299, 302, 304, 317, 318, 319, 324; 181/230, 231, 240, 248, 249
See application file for complete search history.

(56) References Cited

U.S. PATENT DOCUMENTS

| 3,438,721 | A | * | 4/1969 | Innes ....................... 423/213.2 |
| 3,811,845 | A | | 5/1974 | Nakamura |
| 4,050,903 | A | | 9/1977 | Bailey et al. |
| 4,094,645 | A | | 6/1978 | Bailey |
| 4,183,896 | A | | 1/1980 | Gordon |
| 4,579,194 | A | | 4/1986 | Shiki et al. |
| 5,402,938 | A | | 4/1995 | Sweeney |
| 5,421,154 | A | | 6/1995 | Pfefferle et al. |
| 5,521,339 | A | * | 5/1996 | Despain et al. ............. 181/230 |
| 5,590,522 | A | | 1/1997 | Kynsilehto et al. |
| 5,738,184 | A | * | 4/1998 | Masuda et al. ............. 181/262 |
| 5,755,095 | A | | 5/1998 | Maurer |
| 5,771,682 | A | | 6/1998 | Simons |
| 5,857,327 | A | * | 1/1999 | Sato et al. ..................... 60/302 |
| 5,881,554 | A | | 3/1999 | Novak et al. |
| 5,887,424 | A | | 3/1999 | Kuroshita |
| 5,921,080 | A | | 7/1999 | Ulmet et al. |

(Continued)

*Primary Examiner*—Binh Q Tran
(74) *Attorney, Agent, or Firm*—Borden Ladner Gervais LLP; Jeffrey W. Wong

(57) ABSTRACT

The exhaust gas purification device has a first chamber having an exhaust pipe inlet, an ambient air inlet, and an exhaust gas outlet. A Venturi is arranged within the chamber, having an inlet end communicating with an ambient air inlet, a throat, and an outlet end communicating with an exhaust gas outlet. The Venturi has an exhaust gas inlet between its inlet end and its outlet end, receiving exhaust gas from within the chamber, directed generally towards the outlet end of the Venturi, so that ambient air and exhaust air are mixed in passing through the Venturi to its exhaust gas outlet. A perforated pipe within the first chamber receives the exhaust gas, and the exhaust gas escapes there from via the perforations, into the chamber and thence to the Venturi. A second chamber, having a catalytic substrate assembly mounted therein, receives the mixed ambient air and exhaust air from the exhaust gas outlet of the Venturi, and has an exhaust pipe outlet.

17 Claims, 3 Drawing Sheets

U.S. PATENT DOCUMENTS

| | | | |
|---|---|---|---|
| 6,164,066 A * | 12/2000 | Sakaguchi et al. | 60/302 |
| 6,220,387 B1 | 4/2001 | Hoppes et al. | |
| 6,250,075 B1 | 6/2001 | Funakoshi et al. | |
| 6,273,071 B1 | 8/2001 | De Lima | |
| 6,321,531 B1 | 11/2001 | Caren et al. | |
| 6,343,593 B1 | 2/2002 | De Lima | |
| 7,048,895 B2 | 5/2006 | Shirahata et al. | |
| 7,156,202 B2 * | 1/2007 | Assad | 181/258 |
| 2005/0039456 A1 | 2/2005 | Hayashi | |
| 2005/0271561 A1 | 12/2005 | Lancaster et al. | |

* cited by examiner

DEVICE FOR EXHAUST GAS PURIFICATION FOR SPARK-IGNITED ENGINES

REFERENCE TO RELATED APPLICATION

This is a formal application based on and claiming the benefit of provisional patent application No. 60/740,667, filed Nov. 30, 2005.

BACKGROUND OF THE INVENTION

This invention relates generally to spark-ignited engines. More particularly, this invention relates to a device for exhaust gas purification for spark-ignited engines.

Exhaust emissions from spark-ignited engines, especially from small spark-ignited engines such as those used in lawn mowers, small generators, floor cleaning machines, are significant sources of harmful pollution gases. In contrast to automotive engines which are equipped with a closed-loop air/fuel ratio control system, such engines operate without an air/fuel ratio control system in a fuel-rich environment, and are much dirtier than automotive engines. In order to reduce harmful exhaust emissions, a three-way catalytic (TWC) converter is widely used. With fuel-rich combustion, the TWC converter cannot reduce carbon monoxide (CO), hydrocarbon (HC) and nitrogen oxides ($NO_x$) simultaneously at its maximum efficiencies due to a lack of the oxygen which is needed for full catalyst functionality. Hence, it is desirable to introduce a certain amount of secondary air into the exhaust stream ahead of the TWC catalyst/converter to compensate for the oxygen shortage in the engine-out emissions There have been some exhaust emission purification devices using Venturi devices to help introduce secondary air into raw exhaust and enhance TWC catalyst efficiency. These Venturis use a traditional type of structure including a tubing or narrow channel with a convergent contraction structure (a throat) in the middle, and a small passage or multi-holes/apertures connecting the Venturi throat to the ambient in order to draw in secondary air. The exhaust flow stream goes into and exits the Venturi in line. The secondary air is introduced usually perpendicularly to the main flow stream of the exhaust. Due to exhaust pressure pulsation, there is often a back-flow or blow-out problem, i.e. the untreated harmful exhaust gases are blown out through the secondary air passage prior to entering the TWC catalyst whenever the exhaust pressure is higher than the ambient pressure. Another challenge is to compromise pressure drop and vacuum level for best performance.

In general, therefore, the performance of prior art devices has been lacking, and there is a need for an alternative device to provide suitable exhaust gas purification for spark-ignited engines.

SUMMARY OF THE INVENTION

It is an object of the invention to provide an exhaust gas purification device which avoids or mitigates some of the problems of prior art devices and/or which improves on prior art devices.

The following summary refers to some specific features and advantages which are not necessarily present in all embodiments of the invention. The invention is as defined by the claims, not by this summary.

In an exemplary embodiment, the invention includes a three-way catalytic (TWC) converter or TWC muffler together with a built-in Venturi for spark-ignited internal combustion engine and open-loop fuel supply system. The Venturi device includes an anti-backflow feature and strong vacuum-creating ability over a traditional Venturi device. The device has no moving parts and is relatively inexpensive to manufacture.

The Venturi device may be incorporated in an engine exhaust system for the purpose of lowering exhaust temperature or diluting the exhaust to lower emissions level in applications involving confined working areas such as warehouses, underground mines, or other areas where there are needs to lower the exhaust temperature and exhaust dilution.

The device may include a metal housing with exhaust inlet pipe and outlet pipe, made of any metal alloy but preferably of stainless steel, mild steel or aluminized steel sheet. In various embodiments, the following may be housed within the housing: a Venturi structure with means of connecting to both the engine exhaust and ambient, stamped members which are plates or disks that divide the internal housing into at least two chambers with tubes connecting the chambers if necessary, a TWC catalytic substrate located downstream of the Venturi structure, and a means (said outlet pipe) for outputting the exhaust gases after they have been treated in the TWC catalyst.

The Venturi may include structure that allows the exhaust stream to flow sideways to the cylindrical Venturi structure and turn around to pass through the narrow throat to the Venturi outlet. The ambient air (secondary air) is sucked in due to the vacuum created by the higher gas speed at the location of the throat and joins the exhaust flow in the same direction. In traditional Venturis, the main exhaust gases flow in and out of the Venturi in the same direction while secondary air flows sideways, joining the main exhaust stream.

If desired, a one-way valve may be provided in the ambient air inlet in order to avoid any untreated exhaust gases being blown out when strong exhaust pulsation exists. The Venturi structure size can be altered according to exhaust flow range and back pressure range.

The TWC catalytic substrate can be any of flow-though ceramic monolith with different cell densities or a metallic substrate or a wire mesh or ceramic/metallic foam or any of their combination coated with catalytic washcoat and catalyst materials such as platinum, rhodium, palladium or any of their combinations, or any other suitable substrate presently known or developed in future.

The preferred embodiment of the invention may have some or all of the following advantages: reduced risk of exhaust back-flow or blow-out through the Venturi secondary air passage, due to the unique Venturi structure making use of the flow kinetic energy and creating a rectifying effect against possible back-flow; a pressure drop over the Venturi structure which may be lower than that of most conventional Venturis; greater capability in terms of introducing secondary air than with a conventional Venturi, resulting in a smaller Venturi size and therefore reducing the cost of the device; eliminating a significant percentage of the harmful exhaust emissions such as carbon monoxide (CO), hydrocarbon (HC) and nitrogen oxides ($NO_x$) coming from the combustion of a spark-ignited internal combustion engine especially without stoichiometric air/fuel ratio control system; and providing cooler exhaust temperature or exhaust dilution in applications where that is required or desired.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Embodiments of the present invention will now be described, by way of example only, with reference to the accompanying drawings, wherein.

DETAILED DESCRIPTION

Figure 1:
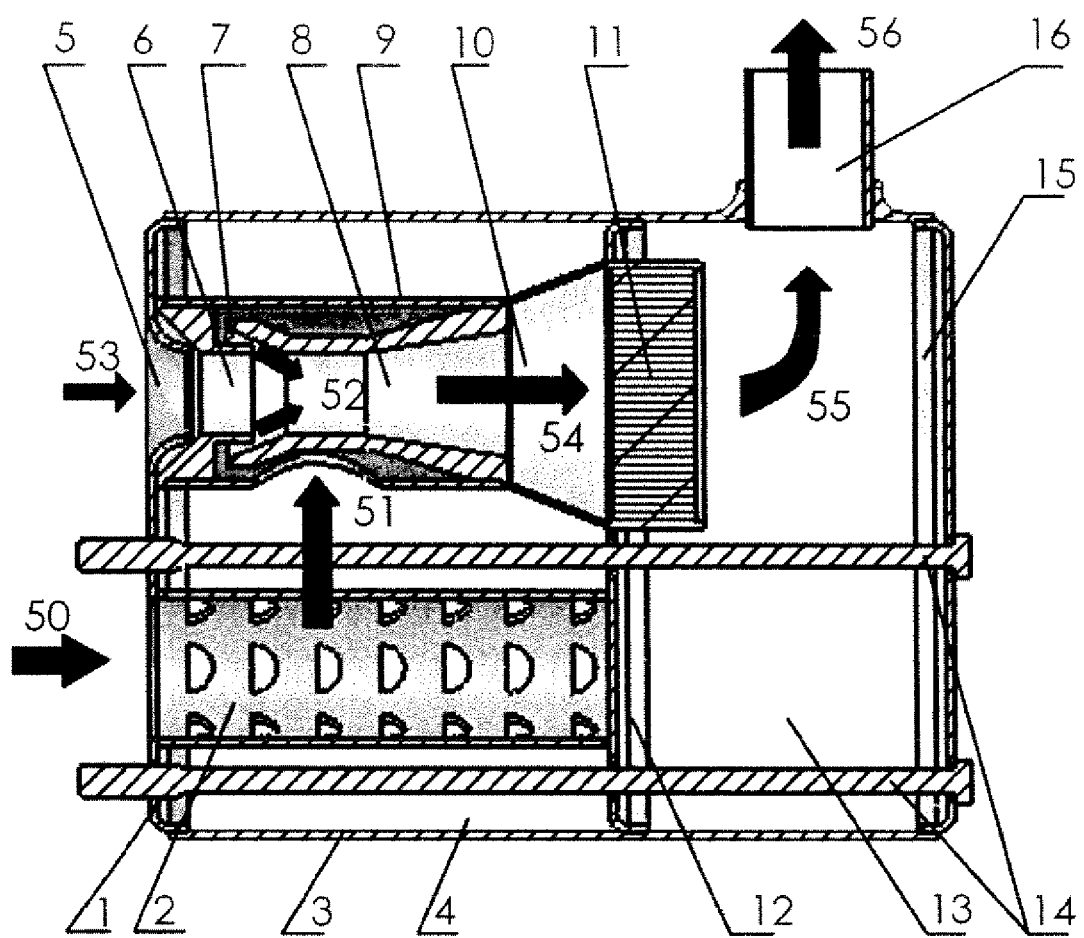
FIG. 1 is a cross-sectional side view of a preferred embodiment of a device according to the invention.
Figure 3:
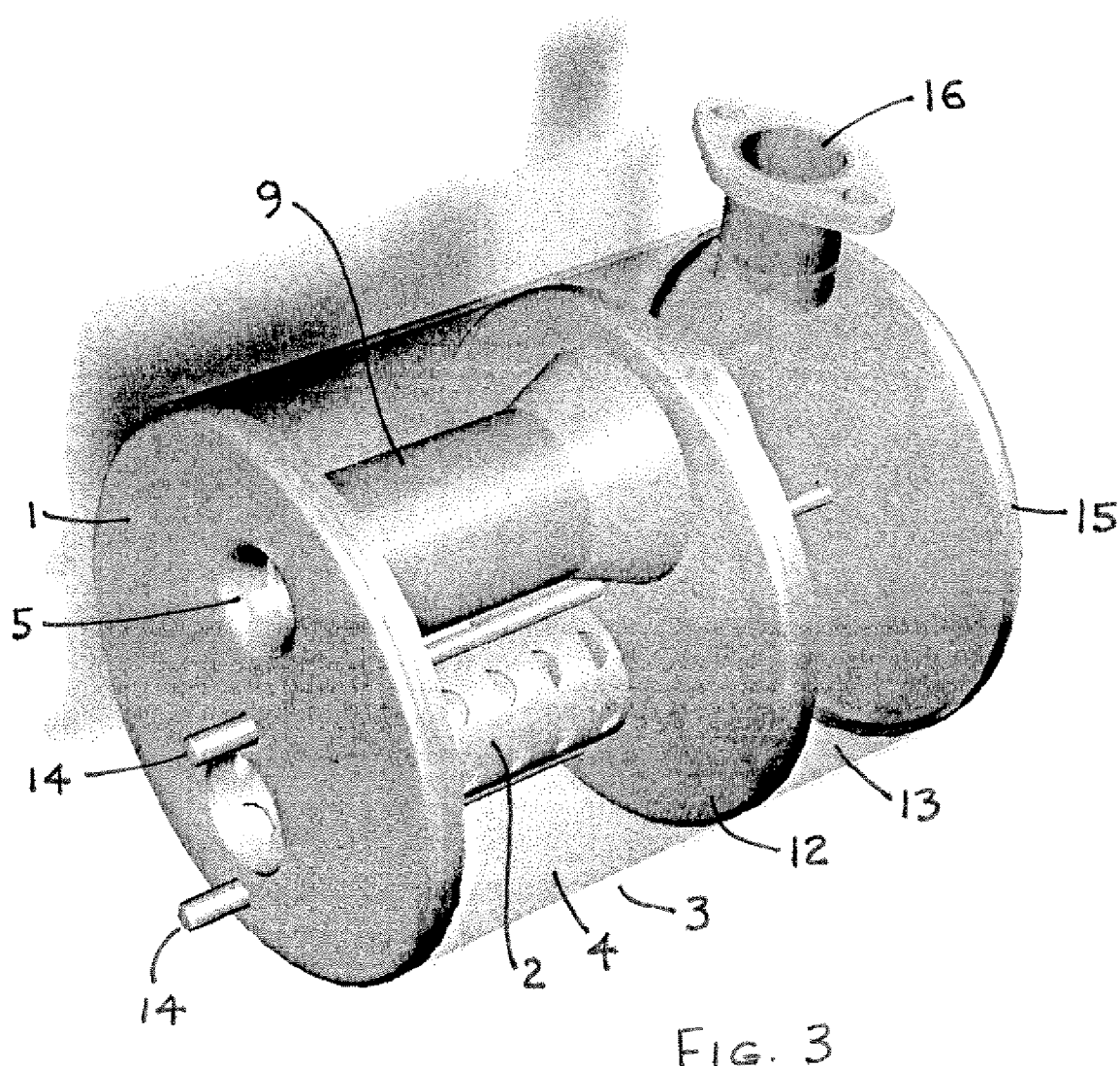
FIG. 3 is a perspective view of the preferred embodiment, with the outer housing partially cut away for clarity.

FIG. 1 is a side view of an exemplary embodiment of the exhaust gas purification device, and FIG. 3 is a cut-away perspective view. In this example, the device is attached to the exhaust manifold of a small spark-ignited ("S.I.") gasoline engine, such as a Honda GCV160 (not shown). The device is affixed to the engine exhaust manifold by through-bolts 14 so as to receive the untreated raw exhaust gases 50 from the engine. It is to be understood that although the example of this embodiment uses through-bolts the attachment methods of the device to an engine exhaust system could be any method such as flanged attachment, welding, etc.

As illustrated in FIGS. 1 and 3, the device has an outer housing 3. Across the front of the outer housing is a stamped front cap 1 with an open ambient air inlet element, here in the form of a cone 5, to a Venturi 9 and an exhaust gas inlet opening which accommodates a perforated exhaust gas inlet pipe 2. At the rear of the outer housing is a stamped rear cap 15. An exhaust outlet pipe 16 extends out the side of the housing near the rear thereof.

Inside the device, there are two expansion chambers separated by a stamped separation plate 12. The first chamber 4 holds the Venturi 9 while the second chamber 13 accommodates the catalytic substrate assembly 11. It is to be understood that any of the chambers could function either as resonator together with perforated tubing or as expansion chamber for noise attenuation purposes, for the purification device to act as an exhaust catalytic muffler, and if desired, there could be more than two expansion chambers. The perforated exhaust inlet pipe 2 in this embodiment is welded to the stamped front cap 1 and to the separation plate 12.

Figure 2:
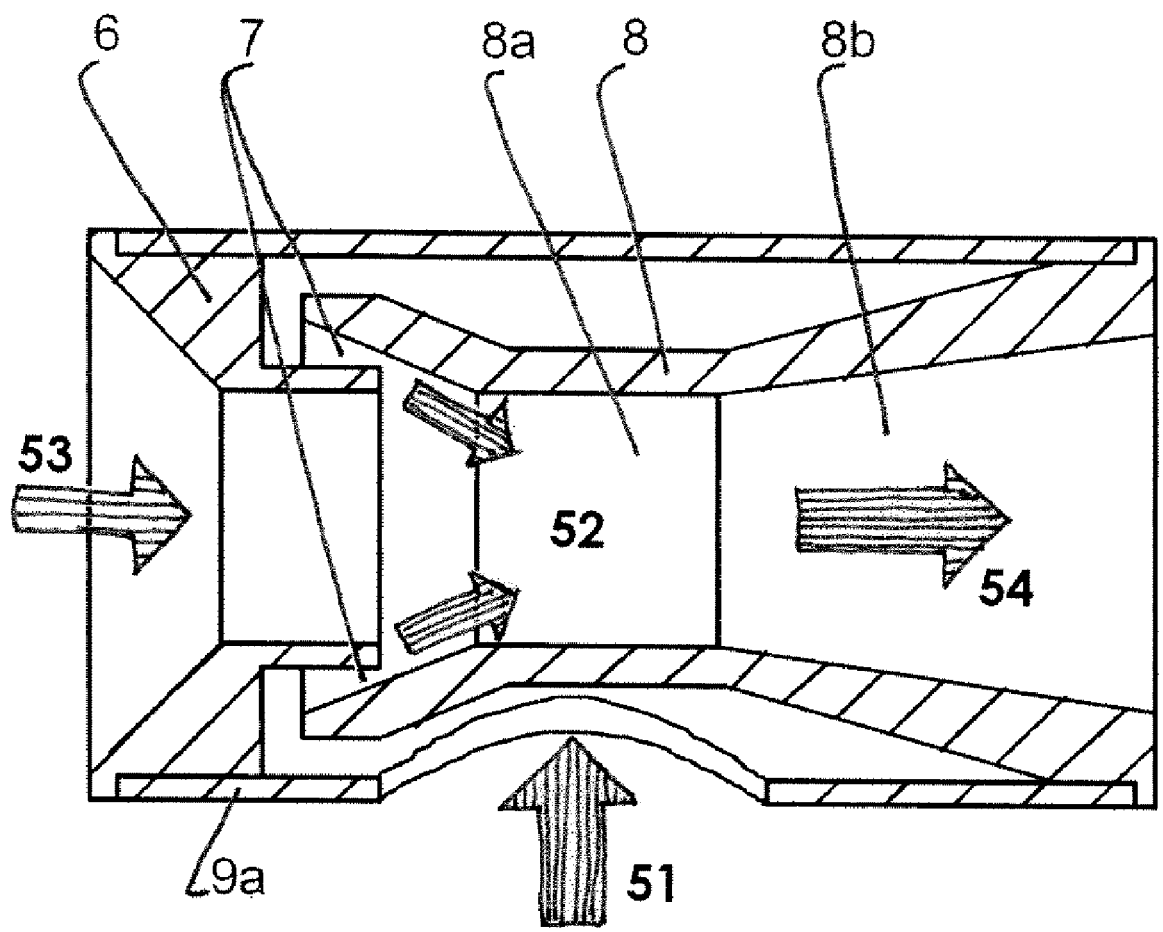
FIG. 2 is a cross-sectional side view of the Venturi structure within the device.

As seen more clearly in FIG. 2, the Venturi 9 has an air injector 6, the main Venturi body 8 (a convergent part, a throat and a divergent part), and the outer shell 9a. The air injector 6 could be constructed together with a perforated cap that has potentially adjustable openings or holes in order to adjust or control the secondary air quantity and create a suitable exhaust mixture for optimal catalyst activity. A one-way valve could be added in front of the air injector, with or without the perforated cap, to avoid exhaust backflow into the ambient air through the air injector 6 in case the exhaust pulsation is very strong.

The catalyst substrate 11 is preferably made of but not limited to ceramic and metallic cores with cell densities from 300 to 900 cpsi (cells per square inch) and ceramic and metallic foams with pore densities from 20-50 ppi (pores per inch). The substrate cross-section may take shapes of round, race-track, oval, rectangle, square or other irregular shapes if needed. The catalysts used for this invention could be based on single metal (Pt-platinum, Pd-palladium), bi-metal (Pt/Rh-rhodium or Pd/Rh) or tri-metal (Pt/Pd/Rh) catalyst formulations with metal loading ranges preferably from 0.2% to 1.5%. The catalyst washcoat materials could be Alumina, Zirconia or their combination mixed with different precursors, promoters and stabilizers such as but not limited to any salts and oxides of rare earth materials (Ba, Ce, La, etc). The catalyst substrate is not the point of the invention, and could vary according to the prior art and future developments.

In operation, S.I. internal combustion engines without electronic air/fuel ratio control usually work at rich air/fuel mixture which gives rise to raw exhaust gases that lack enough oxygen for effective catalytic conversion. The untreated raw exhaust gases 50 shown in FIG. 1 flow into the purification device through perforated inlet pipe 2. The exhaust flow 51 then goes through the perforated holes and expands in the chamber 4 which results in noise attenuation and damps the exhaust pressure pulsation. It is important for the pressure damping to occur before exhaust gases enter the Venturi because the pressure pulsation could cause untreated exhaust blow-out through Venturi air injector 6 to ambient, unless there is a one-way valve (described above as an option).

The exhaust flow 51 then moves into the Venturi through the opening as shown in FIG. 1 and FIG. 2, and finds its way through the gap 7 towards the Venturi throat 8a (FIG. 2). When the flow 51 passes through the narrow gap at high speed, a vacuum is created both at the gap and at the Venturi throat which draws fresh air 53 from ambient air through inlet cone 5 and air injector 6. The fresh air is then mixed with the raw exhaust 51 and the new mixture 52 leaves the Venturi through divergent section 8b (FIG. 2) and connecting cone 10, producing a suitable exhaust mixture 54 with enough oxygen before entering the catalytic substrate 11. One important feature in this invention is that the ambient air joins the main exhaust flow in the same direction instead of entering sideways as in a traditional Venturi design. The kinetic energy of the ambient stream greatly reduces the possibility of partial exhaust flow back to the ambient through Venturi inlet due to exhaust pressure pulsation.

After mixing of the raw exhaust 51 with fresh air 53 in the Venturi, the new exhaust mixture 52 is ready to go through the TWC catalyst for purification. With enough oxygen in the exhaust mixture, the catalyst 11 is now able to convert the three emission gases simultaneously, i.e. from CO, HC and $NO_x$ to $CO_2$, $H_2O$ and $N_2$. The treated gases 55 then go into second expansion chamber 13 for further noise attenuation and leave the purification device as purified gases 56 through exhaust outlet 16.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. An exhaust gas purification device for a spark-ignited engine comprising:
   a Venturi including:
      an inlet end for receiving ambient air;
      an outlet end; and
      a straight throat portion connected between the inlet end and the outlet end;
   wherein when exhaust gas is received at the inlet end of the Venturi, the exhaust gas is directed towards the outlet end thereby drawing ambient air from the inlet end in the same direction of flow as the directed exhaust gas to be mixed with the exhaust gas en route to the outlet end.

2. The exhaust gas purification device of claim 1 further including a catalytic substrate assembly for receiving the mixture of exhaust gas and ambient air from the outlet end to purify the mixture.

3. The exhaust gas purification device of claim 1 wherein the exhaust gas inlet is located between the inlet end and the throat portion.

4. The exhaust gas purification device of claim 1 further comprising:
   an ambient air inlet element extending towards the inlet end, with the exhaust gas entering the Venturi radically outward from the ambient air inlet element.

5. The exhaust gas purification device of claim 1 further comprising:
   an air injector, located adjacent the inlet end, for controlling the amount of ambient air received in the device.

6. The exhaust gas purification device of claim 5 further comprising:
   a one-way valve located between the air injector and the inlet end for blocking the exhaust gas from exiting through the inlet end.

7. The exhaust gas purification device of claim 1 further comprising:
   an inlet pipe for receiving the exhaust gas and for directing the exhaust gas towards the exhaust gas inlet.

8. The exhaust gas purification device of claim 7 wherein the inlet pipe is perforated.

9. The exhaust gas purification device of claim 1 wherein the outlet end is connected to an exhaust pipe.

10. The exhaust gas purification device of claim 9 wherein a catalytic substrate assembly is connected between the outlet end and the exhaust pipe.

11. The exhaust gas purification device of claim 1 further comprising:
    a tube eccentric to the throat portion and enclosing the throat portion.

12. The exhaust gas purification device of claim 11 further comprising:
    an exhaust gas inlet for receiving exhaust gas in a direction perpendicular to the tube.

13. An exhaust gas purification device for a spark-ignited engine, comprising:
    a first chamber having an exhaust pipe inlet, an ambient air inlet and an exhaust gas outlet; and
    a Venturi, arranged within the first chamber, having an inlet end for receiving ambient air from the ambient air inlet, an outlet end in communication with the exhaust gas outlet, and a straight throat portion connected between the inlet end and the outlet end;
    wherein exhaust gas enters the chamber via the exhaust pipe inlet; and
    wherein when the exhaust gas is received in the inlet end, the exhaust gas is directed towards the outlet end thereby drawing ambient air from the inlet end in the same direction of flow as the directed exhaust gas to be mixed with the exhaust gas en route to the outlet end.

14. The exhaust gas purification device of claim 13 further comprising:
    a second chamber, adjacent the first chamber, including
    a catalytic substrate assembly mounted therein, for receiving an output from the outlet end; and
    an exhaust pipe outlet;
    wherein the catalytic substrate assembly purifies the output before releasing the purified gas through the exhaust pipe outlet.

15. The exhaust gas purification device of claim 14 wherein the first and second chamber are separated by a separation plate.

16. The exhaust gas purification device of claim 13 wherein the exhaust pipe inlet includes perforations allowing the exhaust gas to exit there from into the exhaust gas inlet from the first chamber.

17. An exhaust gas purification device for a spark-ignited engine comprising:
    a Venturi including:
       an inlet end for receiving ambient air;
       an outlet end; and
       a straight throat portion connected between the inlet end and the outlet end;
    a tube eccentric to the throat portion enclosing the throat portion; and
    an exhaust gas inlet for receiving exhaust gas in a direction perpendicular to the tube;
    wherein when the exhaust gas is received in the tube, the exhaust gas is directed towards the inlet end and once passing through it thereby draws ambient air from the inlet end in the same direction of flow as the directed exhaust gas to be mixed with the exhaust gas en route to the outlet end.

* * * * *